United States Patent [19]

Paakki

[11] Patent Number: 4,466,856

[45] Date of Patent: Aug. 21, 1984

[54] EQUIPMENT FOR THE MANUFACTURE OF A CONTINUOUS MULTI-LAYER VENEER BOARD

[75] Inventor: Matti Paakki, Lahti, Finland

[73] Assignee: Raute Oy, Lahti, Finland

[21] Appl. No.: 549,643

[22] Filed: Nov. 4, 1983

Related U.S. Application Data

[63] Continuation-in-part of Ser. No. 392,071, Jun. 25, 1982.

[51] Int. Cl.³ .............................................. B32B 31/00

[52] U.S. Cl. .................................... 156/558; 156/559; 156/563

[58] Field of Search ........ 156/297, 299, 300, 556–559, 156/563, 580

[56] References Cited

U.S. PATENT DOCUMENTS

| | | | |
|---|---|---|---|
| 3,131,737 | 5/1964 | Pearl | 156/558 |
| 3,461,932 | 8/1969 | Shelton | 156/159 X |

*Primary Examiner*—David A. Simmons

*Attorney, Agent, or Firm*—Wolf, Greenfield & Sacks

[57] ABSTRACT

The subject of the invention is equipment for the manufacture of a continuous multi-layer veneer board consisting of veneer sheets. In the equipment, the component devices have been combined into an integrated whole, whereby complete automation of the operation of the equipment is possible.

1 Claim, 16 Drawing Figures

FIG. 4
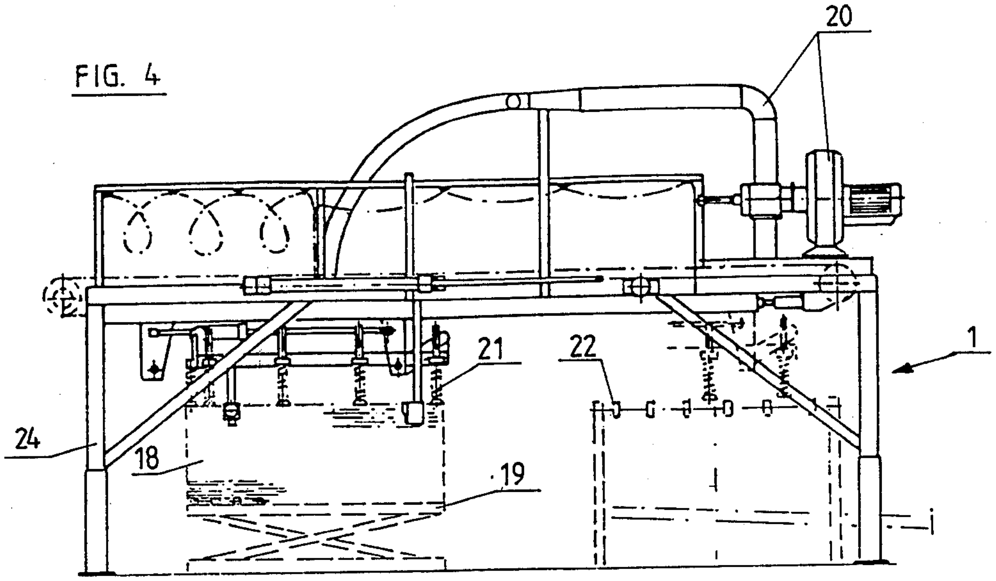
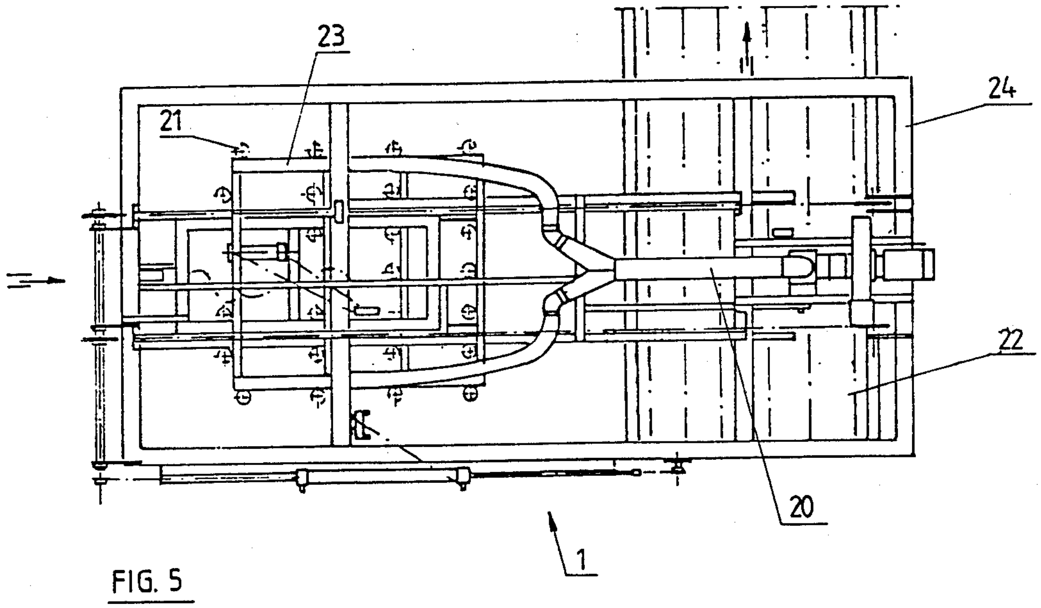
FIG. 5

FIG. 9
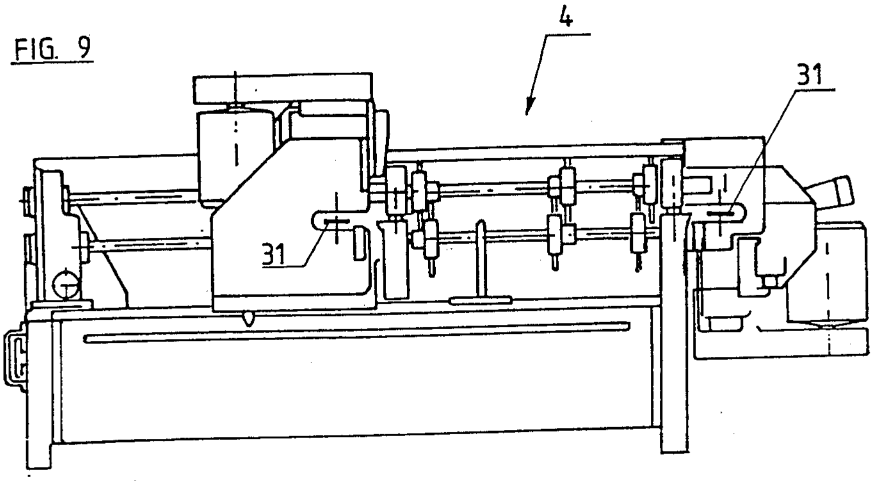
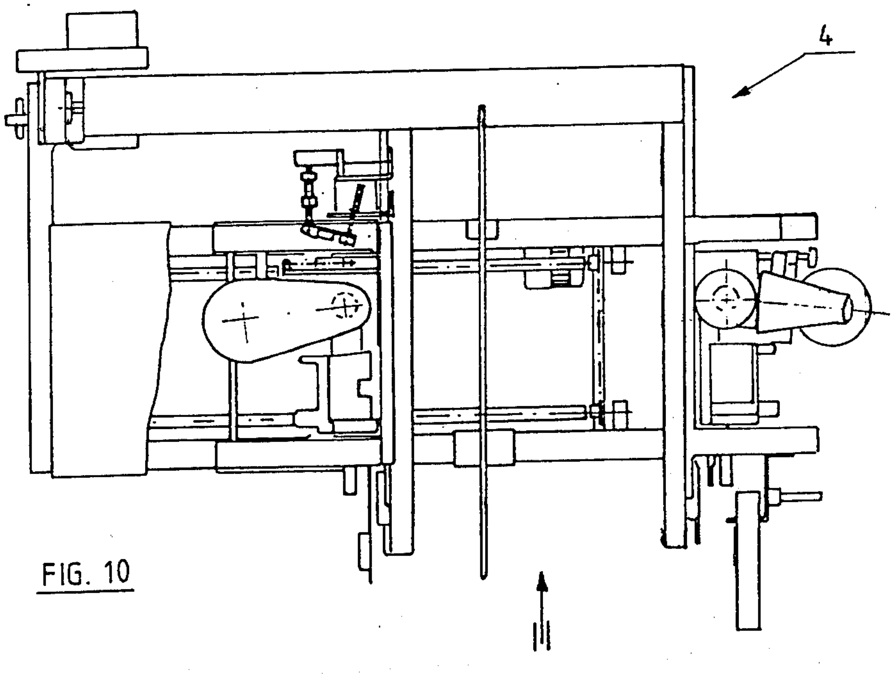
FIG. 10

BACK- AND CORE VENEER

FACE VENEER

EQUIPMENT FOR THE MANUFACTURE OF A CONTINUOUS MULTI-LAYER VENEER BOARD

This application is a continuation-in-part of application Ser. No. 392,071, filed on June 25, 1982.

FIELD OF THE INVENTION

The subject of the present invention is equipment for the manufacture of a continuous veneer board consisting of veneer sheets glued one after the other and, as layers, one above the other.

DESCRIPTION OF THE PRIOR ART

Veneer boards of the type concerned have been manufactured in prior art by means of equipment consisting of several separate units of equipment, between which it has been necessary to store the veneer sheets and which require a considerable amount of manual work from the operators of the equipment.

SUMMARY OF THE INVENTION

In the equipment in accordance with the invention, the various operative units have been combined into an integrated whole, wherein the individual veneer proceeds through all the steps of treatment to the finished final product untouched by the hand. Owing to the integrated whole, full automation of the operation of the various units of equipment is permitted, whereby the function of the operating personnel remains just to supervise the operation of the equipment. A reduced role of the human factor in the production also contributes to an improved uniformity of the quality of the product.

BRIEF DESCRIPTION OF THE DRAWING

The equipment in accordance with the invention will be described in more detail by means of the attached drawings, wherein FIG. 4 shows the component apparatus 1 of the equipment, shown in FIGS. 1 and 2, as viewed from the side, in direction B in FIG. 1, FIG. 5 shows the apparatus of FIG. 4 as viewed from the top, FIG. 9 shows the apparatuses 4 and 5, shown in FIGS. 1 and 2, as viewed in the direction of passage of the veneer, FIG. 10 shows the apparatus of FIG. 9 as viewed from the top.

DESCRIPTION OF THE PREFERRED EMBODIMENT

Figure 1:
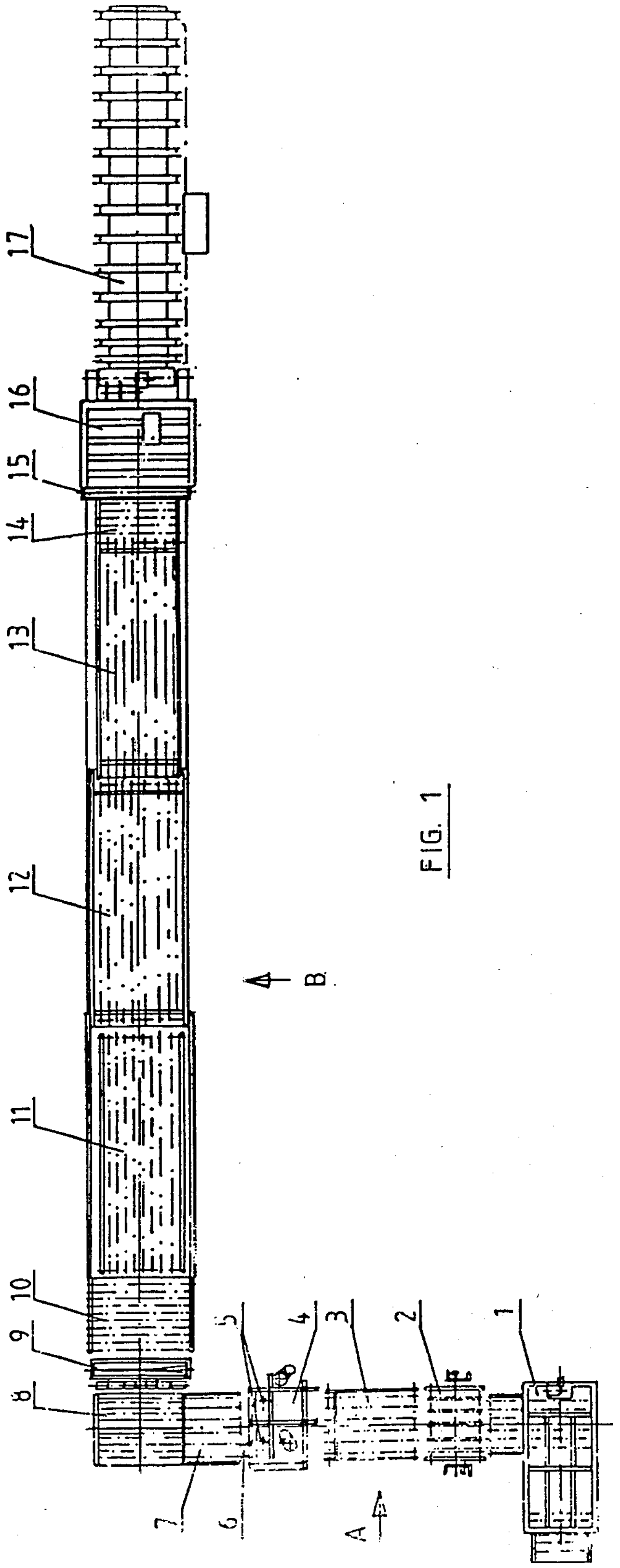
FIG. 1 shows the equipment as a top view.

The more detailed construction of the equipment will be described below, in connection with the description of the functions of the equipment.

The starting material used in the equipment consists of veneer sheets which have been peeled by means of a veneer lathe out of a species of wood suitable for the desired properties of the final product, as well as cut by means of a clipping machine to appropriate dimensions, and dried. The thickness of the veneer is favourably within the limits of 2 to 6 mm, and its other dimensions may be within the limits of 1.3 to 2.0 m, depending on the rest of the equipment and on the desired properties of the final product.

The veneer sheets 18 are lifted, one sheet at a time, by the equipment unit 1 (FIGS. 1, 2, 4, and 5) off a dosage table 19, which is in itself known and which rises as the stack of veneer sheets becomes lower. The sheets are positioned on the dosage table so that the grain direction is the same as the direction A in FIG. 1, whereby the grain direction of the veneers in the finished board is the same as the longitudinal direction of the board. The lifting of the veneer sheets is performed by means of suction pads 21 connected to a suction system 20, the veneer sheet being supported by the said suction pads 21 and shifted onto a belt, chain or equivalent conveyor 22. The raising movement and the lowering movement, respectively, of the suction pad means 21 as well as their shifting in the horizontal plane are performed by means of a hydraulically, pneumatically or electrically actuated lifting and shifting carriage 23, which moves as controlled by limit switches, not shown, and as supported by a frame construction 24.

The veneer lowered onto the conveyor 22 proceeds, as carried by the conveyor, to the equipment unit 2 (FIGS. 1, 2, 6, and 7), the function of the said equipment unit being to turn every other veneer upside down so as to improve the uniformity of the final product. A veneer peeled from a log has, viz., a higher tendency to be curved in one direction, whereby the effects of this curvature on the final product can be reduced by overturning every other veneer, the effects of curvature becoming thereby of opposite directions in successive veneers.

The equipment unit 2 consists of two belt or equivalent conveyor units 25, 26, placed one above the other, the veneers being passed between the said conveyors. The conveyor units 25 and 26 are mounted to a common frame construction 27, which can be overturned through 180° in relation to the horizontal plane by means of a particular turning device 28.

Figure 2:
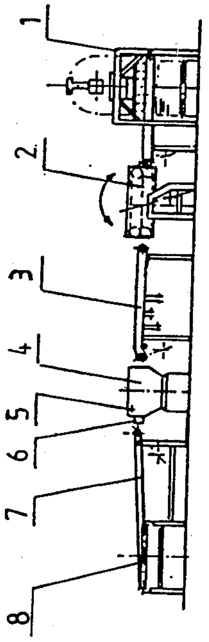
FIG. 2 shows the initial end of the equipment as viewed from the side, in direction A of FIG. 1.
Figure 7:
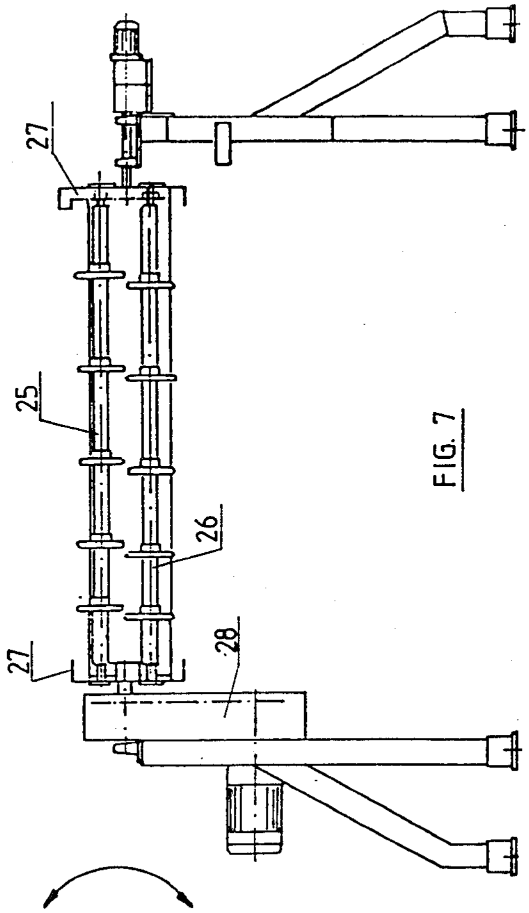
FIG. 7 shows the apparatus of FIG. 6 as viewed in the direction of passage of the veneer.
Figure 6:
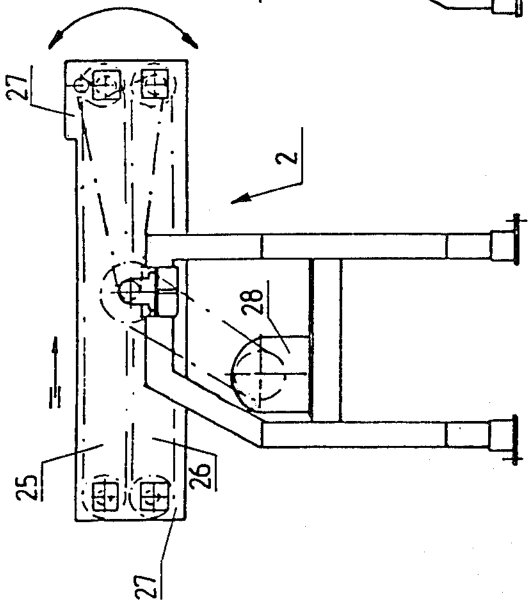
FIG. 6 shows the component apparatus 2 of the equipment, shown in FIGS. 1 and 2, as viewed from the side, in direction A in FIG. 1.
Figure 8:
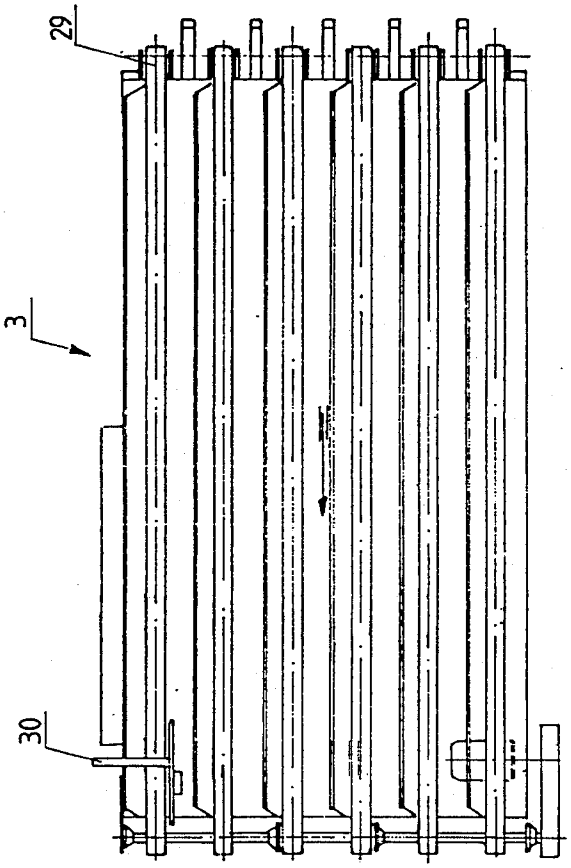
FIG. 8 shows the apparatus 3, shown in FIGS. 1 and 2, as viewed from the top.

The next equipment unit in the equipment is the aligning conveyor 3 (FIGS. 1, 2, and 8). The function of this conveyor is to align the veneer in its direction of travel. The conveyor consists of a belt or equivalent conveyor 29, which is provided with a guide stop 30. By means of the guide stop 30, the edge of the veneer passing on the conveyor 29 is pressed, as operated by means of a pneumatic cylinder or a similar device, so that the veneer is aligned in its direction of travel. The pushing movement of the guide stop 30 can be controlled by various control means, such as photocells, which sense the position of the veneer placed on the conveyor 29.

Figure 11:
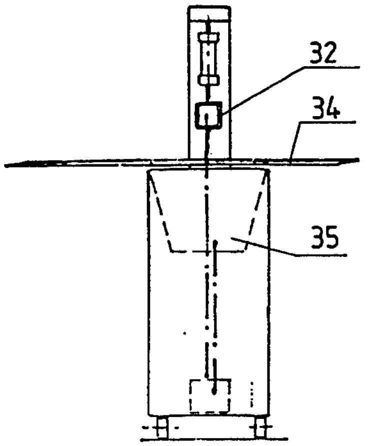
FIG. 11 shows the apparatus 9, shown in FIGS. 1 and 3, as viewed from the side, in direction B in FIG. 1, in the position for the treatment of the back and core veneers.

From the aligning unit 3 the veneer passes to the scarfer and edger units 4 and 5, respectively, wherein the side edges of the veneer are processed to the desired shape and the ultimate length of the veneer is fixed. By means of the scarfer 4 it is possible to chamfer the side edges of the veneer, e.g., in the way coming out from FIG. 11, whereby sucessive veneers can be connected together by means of scarf joints. The employment of the unit 4 is, however, optional. Optimum properties of strength and surface quality are, however, obtained for the veneer board constituting the final product if the edges of all veneers are chamfered by means of the unit 4 in accordance with FIG. 11. However, one of the alternative possibilities is that only some of the veneers, such as the back-layer veneers and the face-layer veneers, are chamfered at their edges in the units 4. Chamfering of the veneers destined for the core layers may be omitted, in which case those veneers are interconnected by means of butt joints instead of scarf joints. In some products, it may be possible to omit the use of the unit 4 totally, in which case all the successive veneers in the final product are interconnected by means of butt joints.

The chamfering operation at the side edges of the veneers if produced in the unit 4 by means of two circular saw blades 31, 31', which are slightly inclined, in the same direction, in relation to the horizontal plane. The inclination depends on the chamfering desired, being usually about 15° in relation to the horizontal plane. The chamfering may, of course, also be performed by means of any other cutting members, such as milling cutters, which produce a similar edge shape for the veneer. After the chamfering step, the tip portion of the chamfered edge of the veneer is aligned by means of circular saws, which form the unit 5 and rotate at a specified distance from each other as placed in the direction of travel of the veneer. These circle saws determine the ultimate length of the veneer sheet.

The glueing unit 6 may be part of the equipment unit 4, 5 (FIGS. 1 and 2), or it may constitute a unit of its own in the equipment. The function of the glueing unit 6 is to apply glue to one of the chamfered edges of the veneer. This edge to be glued is preferably the edge at which the chamfered face is facing upwards. The glueing device may be constructed, e.g., as a revolving roller rolling along the chamfered face, an appropriate glue being passed onto the said roller by means of appropriate dosage devices, not shown in the drawing.

Next, the chamfered and glued, or unchamfered, veneer sheet arrives at the conveyor 7 (FIGS. 1 and 2), which conveyor is preferably a belt or chain conveyor and partly interlocking with the roll conveyor 8 (FIGS. 1 and 2), operating as a crossing conveyor. The final condition of the veneer passing on the conveyor 7 can be checked visually at this stage, whereby, by raising the final end of the conveyor 7 from its position interlocking with the conveyor 8, it is possible to run a defective veneer out of the equipment across the crossing conveyor 8. On the contrary, an acceptable veneer is run in the normal position of the conveyor 7, interlocking with the conveyor 8, to be carried further by the conveyor 8.

Figure 12:
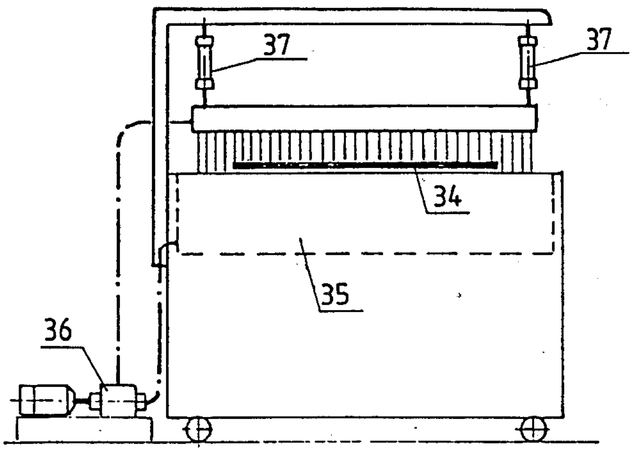
FIG. 12 shows the apparatus of FIG. 11 as viewed in the direction of passage of the veneer.
Figure 13:
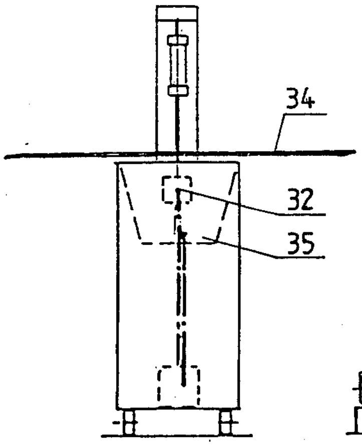
FIG. 13 shows the apparatus of FIG. 11 as viewed from the side, in the position for the treatment of the face veneer.
Figure 14:
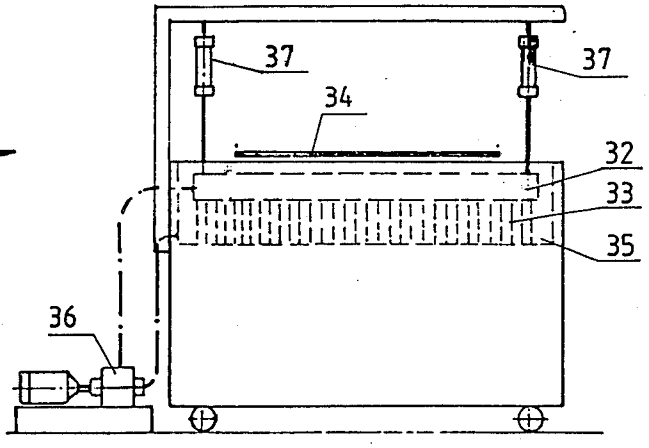
FIG. 14 shows the apparatus of FIG. 13 as viewed in the direction of passage of the veneer.

The crossing conveyor 8 pushes the veneers into the glueing unit 9 (FIGS. 1, 3, 11, 12, 13, and 14), where the faces of the veneers are glued optionally in consideration of the ultimate position of the veneer in the final product. The glueing unit preferably consists of a glue spreading device 32, such as a tube, mounted on an appropriate frame construction, the spreading device 32 being provided with a line of nozzles 33 for spraying the glue onto the veneer 34. Any excessive glue flows into a basin 35 constituting a part of the unit, from which basin the excess glue is recirculated by a pump means back to the nozzles 33 as increased by supplementary glue. The spreading device 32 is suspended on its supporting frame so that it can be lowered to its inoperative position, shown in FIGS. 13 and 14, when a veneer passes through the unit that is supposed to be placed on the upper face of a finished veneer board. During the passage of all the other veneers through the glueing unit, the spreading device is placed in its operative position shown in FIGS. 11 and 12, whereby glue is applied to the upper face of the veneer. The lowering and raising of the spreading device can be performed advantageously by means of two pneumatic cylinder devices 37.

From the glueing device the veneer is passed onto a roll conveyor 10 (FIGS. 1 and 3), which feeds the veneers further to the devices 11, 12, 13, 14, and 15, which produces the final range of veneers on the conveyor 38. These devices comprise a stationary belt conveyor 11, a belt conveyor 12, which is movable in the direction of the track in relation to the conveyor 11, a belt conveyor 13, which is further movable in the direction of the track in the direction of the conveyor 12, and an aligning conveyor 14, which moves along with the conveyor 13. The ranging devices additionally include a holding device 15, which can be shifted in the direction of the track. The relative positions of the said conveyors can be adjusted in the longitudinal direction of the track so that the conveyor 12 can be run to underneath the conveyor 11 and the conveyor 13 correspondingly to underneath the conveyor 12. By means of this relative shifting of positions of the conveyors, the individual veneer sheets can be run one after the other into contact with each other, whereby a unified veneer layer can be run onto the conveyor 38 supporting the complete range over the length of each ranging circuit. By means of the aligning conveyor 14, being one of the ranging devices and being preferably a roll conveyor, each veneer sheet is guided in the lateral direction of the track to its correct position in relation to the preceding veneer and to the range of veneers. As to its embodiments of apparatuses, this conveyor may be in principle similar to the aligning conveyor 3 placed at the initial end of the equipment.

The function of the holding device 15 is to position the joint portions of the veneers in the longitudinal direction of the track so that the joints are not facing each other in the various layers. The device 15 is shifted according to a programme in relation to the conveyor 14 in the longitudinal direction of the track, whereby the device 15, by means of its holding arm 39, admits the veneers forwards to the range of veneers formed on the conveyor 38 as being in the various ranging layers shifted in relation to each other in the longitudinal direction of the track so that the joints are shifted, e.g., about 15 cm in relation to each other in the direction of the track in the veneer layers placed one above the other.

The complete range of veneers is shifted, as carried by the range conveyor 38, into the prepressing device 16 (FIGS. 1, 3, 15, and 16), whose function is to promote the absorption of the glue into the veneers, to induce preliminary adhesion, and to reduce the height of the range so as to facilitate its feeding into the hot press, as well as to feed the complete range of veneers further into the ultimate press 17, which is a hot press.

The prepress 16 is of the type of a periodically operating plane press, which is movable along rails in the longitudinal direction of the track. When the press 16 is open, it is run backwards a certain distance against the complete range of veneers and closed in this rearward position. The press presses the range with an even pressure of the order of 3 bars. The hot press is also of the plane press type similar to the prepress, even though it is longer than the prepress and its press faces are heated. The function of the hot press is to produce glueing by means of pressure and heat. The compression pressures usually used are of the order of 16 bars and the temperature used is about 120° C. (varying within the limits of 110° to 180° C.) During the feeding by the prepress 16, the hot press 17 must, of course, be open in order that the range could move forwards therein. The operation of the press is preferably automatically timed so as to take place in the way described above.

DESCRIPTION OF THE OVERALL OPERATION OF THE EQUIPMENT

As comes out from the above description of the equipment, the last unit in the equipment is the hot press 17, which is also the most dominating unit in the equipment and whose capacity determines the rate of operation of the entire equipment. Under these circumstances, in order that the press 17 could operate at its full capacity, the dimensioning and controlling of the rest of the apparatuses in the equipment must be arranged so that, on the conveyor 38 preceding the hot press, there is at least one press length of the hot press of veneer board ready stacked and prepressed for each cycle of operation of the hot press. The control of the operation of the other apparatuses in the equipment must be guided in such a way on the basis of the cycles of operation of the hot press 17.

There are several control systems of different degrees of automation for operation control of this kind, ranging from manual control to fully centralized computer control, the said control systems being known to a person skilled in the art and being not included in the scope of protection of the present invention.

A usable control system is based on the idea, in itself known, that, in respect of its control, the equipment is divided into functionally logical component units, whose control circuits are based on limit switches, counters, microcircuit components, and equivalent control apparatuses known to a person skilled in the art, the possibilities provided by such control circuits being also familiar to him. In such a case, the circuits controlling the various component units of equipment are connected to each other in a feed back relationship, whereat the preceding unit of equipment does not start its next cycle of operation until the following unit of equipment in the line has completed its cycle of operation or reached a certain stage in its cycle.

In order to describe the detailed operation of the equipment, as the starting point may be taken, e.g., the initial situation of the production of a veneer board of 16 layers, at the stage at which the first veneer sheet, to whose top face glue has been applied in the device 9, is proceeding on the conveyor 12 as is shown in FIG. 1. Thereat, all the subsequent components of equipment are, of course, empty and the parts 11, 12, 13, 14, 15 and 16 moving relative each other are in the positions shown in FIG. 1, i.e., with the exception of the holding device 15, in their positions nearest the hot press 17. The holding device 15 is in this situation in the rearmost position, in relation to the conveyor 14, out of a reason to be explained later on.

Figure 15:
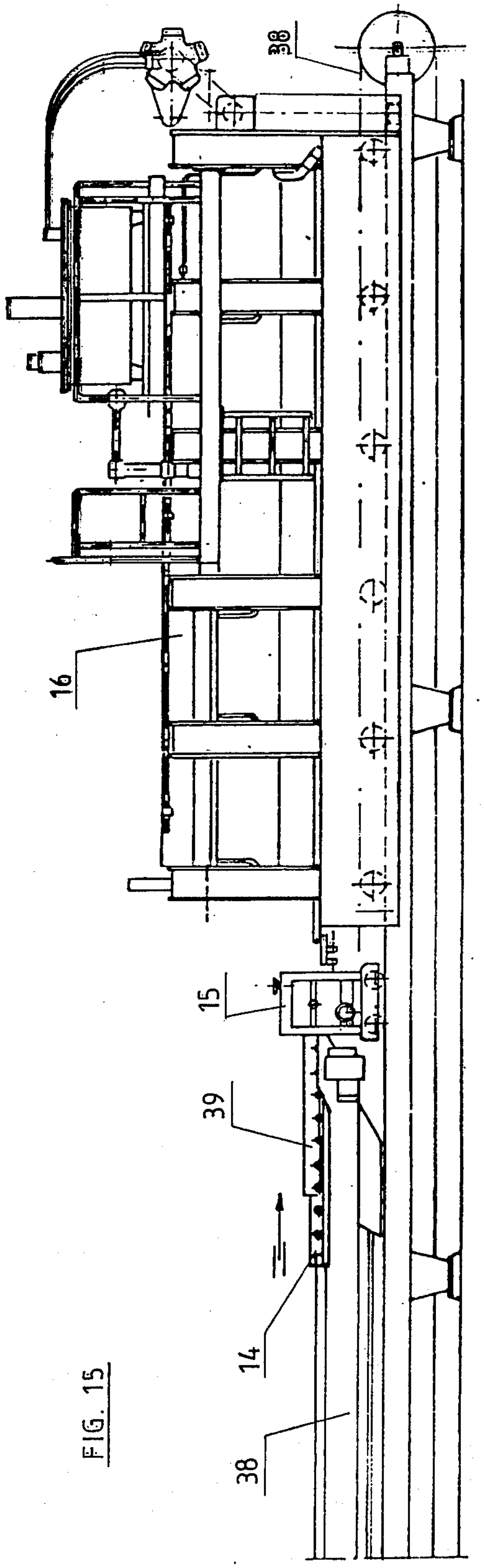
FIG. 15 shows the component apparatuses 14, 15, and 16, shown in FIGS. 1 and 3, as viewed in direction B in FIG. 1.
Figure 16:
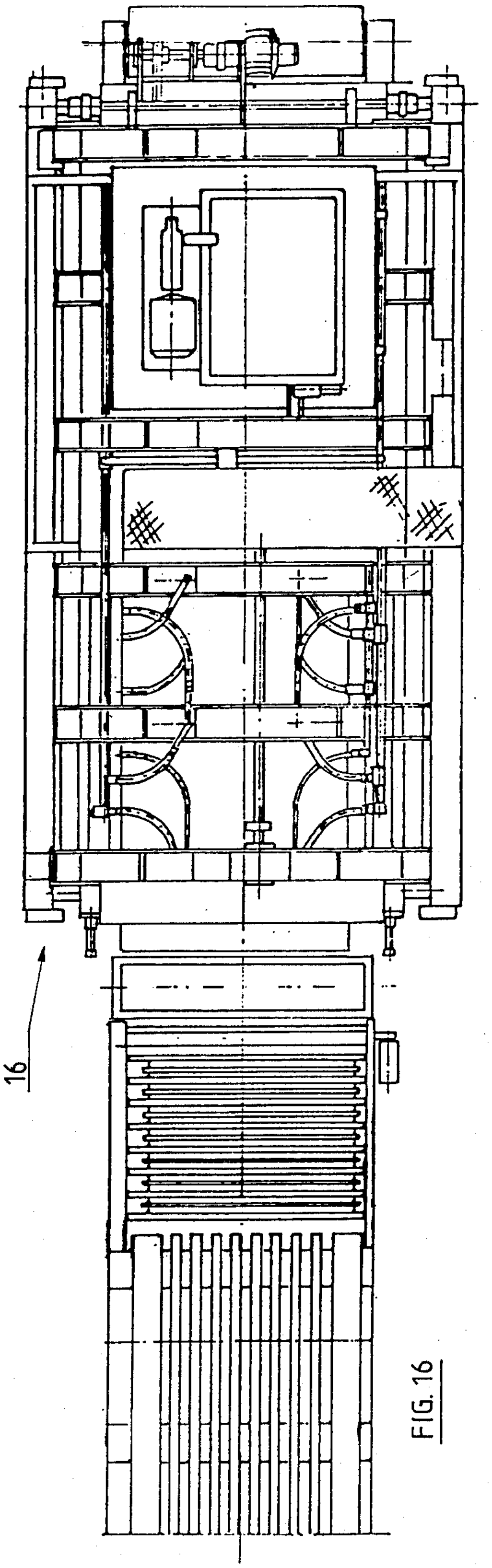
FIG. 16 shows the apparatuses of FIG. 15 as viewed from the top.

The conveyors 10, 11, 12, 13 and 14 revolve constantly and bring the veneer onto the conveyor 14 against the holding arm 39 of the holding device 15 (FIG. 15). On the holding device 15, e.g., a photo cell may be installed, which detects the front edge of the veneer placed against the arm 39 of the holding device and gives an actuating command to the retracting means of the conveyor 13, which pull the conveyor 13 to underneath the conveyor 12 at least over a distance that equals the length of the veneer increased by the projection of the arm 39 to above the conveyor 14. The retracting movement of the conveyor may be controlled by means of a limit switch or of a distance meter connected to the control circuit. The conveyor 14 is connected with the conveyor 13, whereat it is also retracted by the corresponding distance. Hereat, as the conveyor 14 revolves at a speed higher than the retracting speed, the veneer falls down onto the conveyor 38 to the place determined by the arm 39. Instead of the arm 39, the holding device 15 may also be provided with short-arm holding devices which hold the front edge of the veneer until the conveyor 14 has been retracted from underneath the veneer, whereupon the holding devices release their grip, e.g., as controlled by a photo cell. As the next step of operation, the holding device 15 proceeds in the direction of the track over the distance, e.g. 15 cm, by which it is desirable to have the extension joints between the individual veneers in the veneer layers placed one above the other shifted in the longitudinal direction of the veneer board, as compared with the layers placed above and underneath. The said shifting operation may receive its command, e.g., from the photo cell observing the falling down of the veneer or possibly from the apparatus stopping the retracting of the conveyor 13. The movement of shifting of the holding device 15 may be stopped, e.g., by means of a limit switch or by means of a distance meter connected to the control circuit of the holding device, the setting of the said distance meter being preferably also adjustable in view of selective adjustment of the distance of shifting. The members stopping the movement of shifting of the holding device may also give the command to the means of shifting of the conveyor 13 (and at the same time also of the conveyor 14) for running the conveyor 14 again to a certain distance, e.g. defined by a limit switch, from the holding device 15 in view of running a new veneer sheet against the arm 39 of the holding device. Hereinafter, the operation continues in the sequence described above until a stack of 16 veneers has been laid onto the conveyor 38 as interlocking each other by the said 15 cm in the way described above. In the said stack of 16 veneers, the bottommost 15 veneers have received layers of glue onto their upper faces in the device 9 in the way to be explained below, whereas the topmost, 16th veneer is free of glue. The operation of the apparatuses 15, 14, 13 achieving the stacking of the stack of veneers in the way described above is favourably combined so as to be taken care of by one control circuit, which circuit includes a counter device in view of observing the number of the stacked veneer sheets. The operation of this counter device is adjustable in respect of the number of veneer sheets per stack of veneers. In our example case, the counter has been adjusted so that it gives an actuating command after every 16th veneer.

As controlled by this actuating command, the conveyors 13 and 14 move backwards on the stacking track to the starting position of a new cycle of operation, which position is one length of a veneer backwards from the starting point of the first cycle of operation. Starting from this new starting position, the devices 15, 14 and 13 perform the 16-step cycle of operation described above, whereupon they move backwards further to the third starting position so as to start the third 16-step cycle of operation. The operation concerned goes on in the way described above until a veneer board blank has been stacked onto the conveyor 38 whose length is sufficient for feeding into the hot press 17. In order to control this number of 16-step cycles of operation per one cycle of operation of the hot press 17, the said 16-step cycles being performed by the devices 15, 14 and 13, the control circuit of these devices 15, 14, 13 may include a counter device which limits the number of cycles of operation per one cycle of operation of the hot press to such a level that a suitable stack is obtained on the conveyor 38 for feeding into the hot press. In order that a sufficient stacking length could be achieved, it is usually necessary that the conveyor 12 is also retracted telescopically to underneath the conveyor 11 in a way corresponding to the retracting of the conveyor 13 to underneath the conveyor 12. This step of operation is started as controlled by means of control devices in themselves known at the stage at which the conveyor 13 has consumed all of its distance of retracting to underneath the conveyor 12 for its new cycle of operation. The relative telescopic operation of the conveyors 12 and 11 is produced favourably by means of actuating devices corresponding to those used for the corresponding operation between the conveyors 13 and 12.

In close connection with the above apparatuses 15, 14, 13 and 12, the pre-press 16 operates, which also constitutes a component of the equipment. It receives its operation control preferably from the control of the cycles of operation of the apparatuses 15, 14, 13, 12, whereat the pre-press moves from its extreme position shown in FIGS. 1 and 3 (nearest the hot press 17) in the direction against the stacking track by one length of its pressing dimension per each step of pressing. The pressing length of the pre-press may be dimensioned, e.g., so that, at one time, it presses the same distance of veneer sheet as the apparatus 15, 14, 13, 12 stack veneer mat during two of their cycles of operation. In such a case, the cycle of operation of the pre-press has been controlled by means of appropriate devices so as to last double the time of the cycle of operation of the apparatuses 15,14,13,12. As the stacking of the veneer mat proceeds, the pre-press 16 thereby follows along with the holding device 15 almost immediately after it, however, without reaching it.

After the apparatuses 16, 15, 14, 13, 12 have obtained a pre-pressed veneer board on the conveyor, the length of the veneer board corresponding to one pressing length of the hot press 17, the hot press 17 has, as a rule, completed its preceding pressing step, or attempts are at least made to perform the controlling of the operation of the equipment in this way. In the case of particularly thick (many layers) veneer boards, the time of the cycle of operation of the hot press may, however, be to such an extent long that the preceding apparatuses must wait for the start of a new hot-press step. In the latter case, all the apparatuses preceding the hot press receive a waiting command, either directly from the central control or in a feedback relationship from the subsequent apparatus or group of apparatuses that has completed its cycle of operation.

Figure 3:
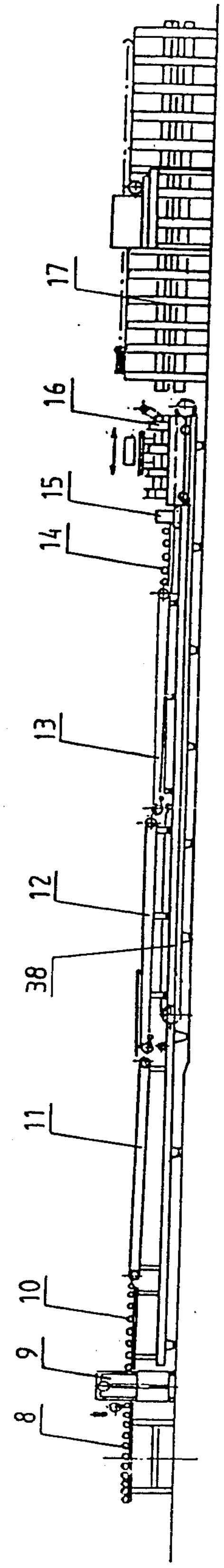
FIG. 3 shows the end part of the equipment as viewed from the side, in direction B in FIG. 1.

Thereupon, the operation of the equipment goes on so that, upon opening of the hot press 17, the pre-press 16, which is at that time in its rearward position and closed, receives a command to move to its forward position, at which it was at the beginning of the stacking cycle in accordance with FIGS. 1 and 3. Thereat, the pre-press feeds the pre-pressed veneer board on the freely revolving conveyor 38 over the length of its transfer distance into the open hot press and, correspondingly, the ready-pressed veneer board over the corresponding distance out of the hot press 17. Thus, the length of the path of movement of the prepress 16 must be limited, e.g. by means of limit switches, to the length of the press length of the hot press 17. After the pre-press 16 has shifted the stacked and pre-pressed veneer board forwards over its transfer distance, the holding devices of the pre-press 16 give control devices of the hot press 17 an actuating command for a new press step. Hereupon, the stacking and pre-pressing operation of the devices 16,15,14,13,12 starts as a new cycle step in the way described above, whereat the first veneer to be stacked is dropped immediately onto the rear edge of the lowermost veneer on the conveyor 38 in the way required by the scarf joint seen in FIG. 11. This last veneer (whose rear edge is placed rearmost) is the veneer that was dropped by the stacking devices 15, 14, 13, 12 as the bottommost veneer in the stacking stack of their preceding cycle of operation. However, if a butt joint is used between the veneers, the first veneer at the beginning of the new cycle of operation of the stacking devices is dropped immediately at the end of the rearmost veneer of the preceding cycle. Hereupon, the cycle of operation of the stacking and pre-pressing devices 16, 15, 14, 13, 12 goes on in the way described above during the pressing stage of the hot press.

Thus, the pre-pressing and stacking devices 16, 15, 14, 13, 12 form one component of the equipment, which has preferably a common control. The control receives its actuating command from the operation of the hot press. Above, a model of operation is described in which the capacity of the hot press 17 is clearly the factor restricting the operation of the equipment. The equipment may, however, also operate without waiting times if, for example, a thin veneer board is produced which has a low number of veneer layers. In such a case, short cycles of operation of the hot press are sufficient for producing the binding effect of the glue used, whereat the devices 16, 15, 14, 13, 12 can operate continuously and the pre-press 16 can feed a new stacked and pre-pressed sequence of veneer board into the hot press 17 immediately upon completion of the stack.

The component devices 8, 9, 10 and 11 of the equipment can be in operation constantly, whereat progress of the veneer during the waiting times of the devices 16, 15, 14, 13, 12 can be prevented, e.g., by means of a stop placed immediately after the conveyor 8, which stop can be pulled to its non-operation position by means of an appropriate control device, which receives its actuating commands, in a known way, from the control of the devices 16,15,14,13,12.

The construction and operation of the glue-spreading device 9 come out from FIGS. 11 to 14. Thus, the device concerned operates constantly, whereat a pump 36 circulates the glue from the basin 35 into the spray device 32. The control of the position of the spray device 32 may be connected, e.g., to a counter device, which, by means of a photo cell, detects the veneers passing through the device. In the production of 16-sheet veneer board in accordance with the invention, the counter controls the position of the spray device 32 to the upper position shown in FIGS. 11 and 12 for the time of the passage of the first 15 veneers. Thereby, the first 15 veneers receivce a glue coating on their upper faces. Immediately after the 15th veneer has passed through the device, the counter device gives a control command by means of which the spray device 32 is lowered to the position shown in FIGS. 13 and 14. Thereby the 16th veneer passes over the device 32 and does not receive a coating of glue on its upper face. Immediately after the 16th veneer has passed through the device 9, the counter device controls the spray device again to its upper position for applying glue to the top faces of the next 15 veneers. The glueing device 9 is quite narrow in the direction of running of the veneer, so that it takes little space between the conveyors 8 and 10, whereby the conveyor 8 can (when the obstacle, not shown, is in the non-operation position) readily push the veneer through the device 9 and further onto the conveyor 10. As an alternative, immediately after the holding device placed after the conveyor, a set of drive rolls (see FIG. 1) may be placed, which promotes the passage of the veneer through the device 9.

In connection with the conveyor 8, a control member is preferably provided, e.g. a photo cell, which detects a veneer present on the conveyor 8. If there is a veneer on the conveyor 8, the devices at the upstream end (initial end) of the equipment receive a waiting command until the veneer has left the conveyor 8. The said arrangement in respect of the control of the devices 1,2,3,4,5,6,7 is fully usable, for the speed of operation of these devices is to such an extent high, as compared with the rest of the equipment, that they do not cause a delay even if the device 1 received its actuating command only as generated by the veneer leaving the conveyor 8. Of course, it is perfectly clear for a person skilled in the art that he may additionally arrange, e.g., the conveyor 3 as a waiting conveyor, which receives its actuating command from the member controlling the veneer present on the conveyor 8. Thereat, a corresponding controlling member must be provided so as to detect a veneer present on the conveyor 3 as well as to give instructions of operation to the devices 1 and 2.

By means of the equipment described above, it is possible to manufacture a continuous veneer board consisting of veneers that have equal wood grain direction and that have been glued together one after the other and as layers one above the other, the width of the said veneer board equalling to the width of the veneer sheets in the direction B in FIG. 1. Out of the veneer board, it is possible to manufacture various multi-layer products, such as beams, floor blanks, and corresponding construction elements by sawing. The number of veneer layers to be piled on the top of each other in the ranged pile depends on the desired final product, but the number is usually 10 to 25 layers.

What is claimed is:

1. Equipment for the manufacture of a continuous multi-layer veneer board, which equipment consists of the following component devices coupled as an integrated whole:

a suction-lift type veneer dosage device for lifting the veneer sheets one sheet at a time from a stack of sheets and for shifting the sheet onto the first conveyor, a first conveyor, which receives the sheets from the said dosage device, a veneer overturning device, which is arranged so as to receive the veneer sheets from the said first conveyor and to overturn every other veneer sheet received through 180° in relation to the plane containing the veneer track, as well as to feed the veneers received forwards, a second conveyor, which is arranged so as to receive the veneer sheets from the said veneer overturning device and to align the veneer sheets in accordance with their track of running, as well as to feed the aligned veneer sheets forwards, a scarfer-edger device, which is arranged so as to receive the veneer sheets from the said second conveyor and which is provided with cutting means for chamfering the side edges of the veneer sheets fed by the said second conveyor, with means for glueing one of the chamfered side edges, as well as with means for feeding the veneer sheets forwards, a cutting aligning device, which is placed after the said scarfer-edger device in the direction of passage of the veneers and whose function is the aligning of the chamfered side edges of the veneer sheets fed by the said scarfer-edger device, a third conveyor, which is arranged so as to receive the sheets fed by the scarfer-edger device through the aligning device, a fourth conveyor, which is arranged so as to receive the veneer sheets from the said third conveyor, as well as as a crossing conveyor with the said third conveyor so that the track of movement of the veneer sheets is changed through 90° as the veneer sheet is shifted from the said third conveyor onto the said fourth conveyor, a glueing device, which is arranged so as to receive the veneer sheets from the said fourth conveyor as well as to spread a glue solution onto the upper face of the veneer sheets, a fifth conveyor, which is arranged so as to receive the veneer sheets fed by the said fourth conveyor through the glueing device and to feed the sheets further, a sixth conveyor, which is arranged so as to receive the veneer sheets from the said fifth conveyor and to feed them further, a seventh conveyor, which is arranged so as to receive the veneer sheets from the said sixth conveyor and to be movable in the direction of passage of the veneer track in relation to the said sixth conveyor so as to be moved at least partly to underneath the said sixth conveyor, as well as to feed the veneer sheets further, an eighth conveyor, which is arranged so as to receive the veneer sheets from the said seventh conveyor and to be movable in the direction of passage of the veneer track in relation to the said seventh conveyor so as to be moved at partly to underneath the said seventh conveyor, as well as to feed the veneer sheets further as a unified mat consisting of successive sheets, a ninth conveyor, which is arranged so as to receive the mat of veneer sheets from the said eighth conveyor as well as to position the sheets in relation to each other as well as in relation to the intended track of passage of the sheets, as well as to move in the direction of passage of the track together with the said eighth conveyor and to transfer the mat of veneer sheets further, a positioning device for positioning the veneer sheets in the direction of the track, which positioning device is arranged so as to hold the veneer sheet mat fed by the said eighth conveyor and transferred by the said ninth conveyour, as well as so as to be shifted in the direction of passage of the track in relation to the said ninth conveyor so that in each sequence of veneer sheet mat consisting of successive veneers and produced by the said sixth, seventh, and eight conveyor, the joints between the successive veneers are positioned at the distance of a certain shift, in the direction of the track, from each other, a tenth conveyor, which is arranged so as to receive the unified veneer mat consisting of successive sheets, from the device for positioning in the direction of the track, as a ranged pile consisting of a desired number of veneer may layers placed one above the other, as well as to transfer the ranged pile further, a preliminary press, which is arranged so as to grasp the ranged pile of veneer mats placed on the said tenth conveyor by pressing and so as to shift the veneer mat range forwards during the pressing, as well as a hot press, which is arranged so as to receive the veneer mat range from the said preliminary press and to induce an adhesion of the veneers together by means of heating and compression.

* * * * *